April 21, 1959 — R. M. SMITH — 2,883,608
STATIC EXCITATION GENERATOR SYSTEM
Filed Jan. 3, 1955

Inventor:
Russell M. Smith,
by Charles A. Mott.
His Attorney.

United States Patent Office 2,883,608
Patented Apr. 21, 1959

2,883,608

STATIC EXCITATION GENERATOR SYSTEM

Russell M. Smith, Ripley, N.Y., assignor to General Electric Company, a corporation of New York Application January 3, 1955, Serial No. 479,565

13 Claims. (Cl. 322—25)

My invention relates to an electromagnetic excitation power system and more particularly to systems for deriving an electric current control signal which is responsive to the greater of two direct current signals. Such a signal, responsive to the maximum current or maximum voltage of the power signal, is especially useful in the control of a magnetic amplifier.

In the control of self-powered vehicles such as diesel generator electric locomotives, in order to protect the electrical equipment, it is frequently necessary to derive a signal which is directly proportional to the current and a signal which is directly proportional to the voltage. Generally these signals are distinct and, at some predetermined maximum signal, an operation is performed to limit the generator voltage and prevent damage of the motors or generators by excessive current or excessive voltage. The combination with both signals near maximum in a diesel generator system will usually result in a power demand by the electrical system that exceeds the power rating of the diesel engine, so that this combination also must be controlled.

Therefore, an object of my invention is a simple and inexpensive system for deriving a control current signal which is proportional to the larger of the load current or the operating voltage.

Another object is to provide an improved static excitation power system.

Briefly, in accordance with my invention in one form, I provide power for my generator control circuit from secondary windings of two similar transformers. The secondary windings are each connected in a separate circuit serially with a control reactor and a bridge rectifier. One of the control reactors is saturated as the current from the generator increases. The other of the control reactors is saturated as the voltage from the generator increases. Each of the bridge rectifiers is connected electrically in circuit to cause the larger current from these circuits to limit the excitation of the generator.

Further objects and advantages of this invention will become apparent and the invention will be better understood from the following description referring to the accompanying drawings. The features of novelty which characterize this invention will be pointed out with particularity in the claims annexed to and forming part of the specification.

Figure 1:
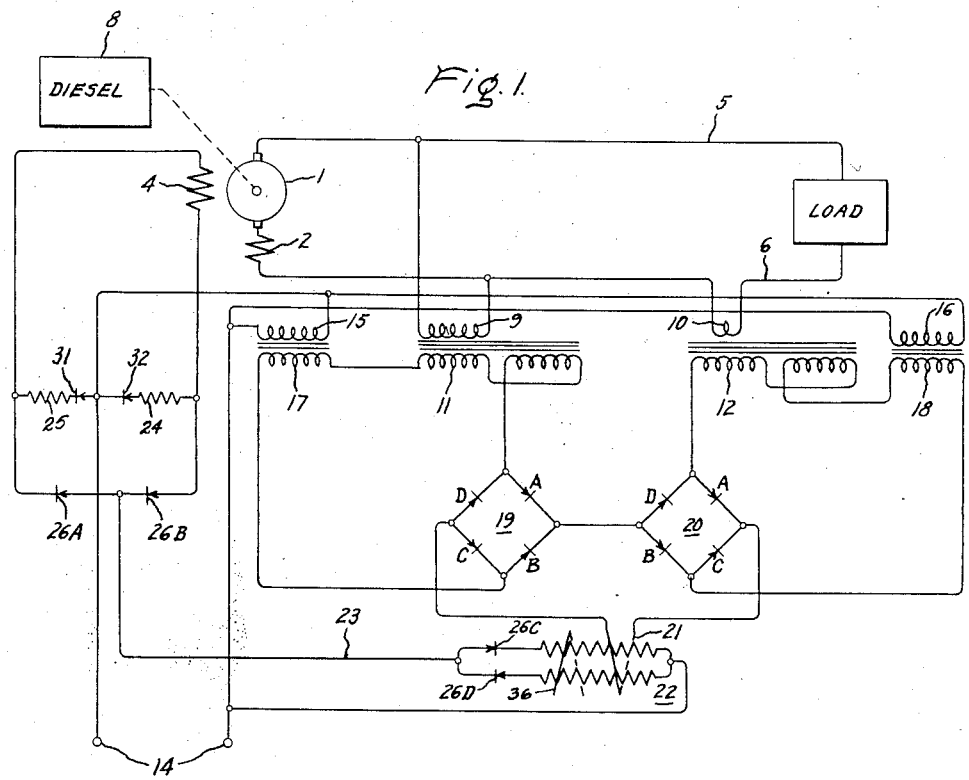
Fig. 1 is a schematic drawing showing one embodiment of my invention.

Referring now to the drawings, in Fig. 1 I have shown a generator 1 having a series field winding 2 and a separately excited field winding 4. The load lines 5 and 6 from the generator are connected to a load which may be the traction motors of a locomotive. The prime mover for the generator 1 is shown as a diesel engine 8.

A voltage sensing winding 9 is connected across the load lines 5 and 6, and a current sensing winding 10 is serially connected in the line 6 between the generator and the load. The winding 9 is connected magnetically to saturate the voltage control reactor 11, and the winding 10 is connected magnetically to saturate the current control reactor 12 to reduce the impedance of these reactors as the signals increase.

The alternating current supply terminals 14 energize the parallel transformer primary windings 15 and 16 to cause a predetermined equal and relatively constant voltage in the secondary windings 17 and 18 for the current load contemplated. The impedance presented by the saturable control reactors 11 and 12 is sufficient to drop substantially all of the voltage from the windings 17 and 18 to a relative low level at the load so that the current in the bridge rectifiers 19 and 20 respectively and through the sensing means shown as control winding 21 of self-saturating magnetic reactor 22 is controlled by the reactors 11 and 12. The impedance of the bridge rectifiers 19 and 20 and the control winding 21 is designed to be much less than the impedance of the reactors 11 and 12 for the currents contemplated. Therefore, the impedance of elements 17, 18, 19, 20 and 21 may be neglected as it is insufficient to effect the theory of operation.

It is well know that a series connected saturable reactor such as 11 or 12 with low load winding impedance and high control winding impedance has the characteristic of making the control ampere turns and load ampere turns equal. The generator voltage produces current in the control winding 9 of the voltage control reactor 11. This causes a current to flow in the bridge rectifier 19 and control winding 21 which is equal to the current in the control winding 9 times the ratio of load winding to control winding turns. With no generator voltage, hence no current in the control winding 9 the impedance of reactor 11 permits only a negligible amount of exciting current to flow. During one-half cycle current flow from the transformer secondary winding 17 will be at a maximum through the rectifier A of the bridge rectifier 19, through the bridge rectifier 20, through the control winding 21, and then through the rectifier C of the bridge rectifier 19. During the other half-cycle of the A.-C. current flowing from the winding 17, the current flow will be through the rectifier B of the bridge rectifier 19, the bridge rectifier 20, the control winding 21, the rectifier D of the bridge rectifier 19, and return through the reactor 11 to the winding 17. It should be noted that the current flow is unidirectional in the bridge rectifier loop and through the control winding 21.

This rectified alternating current in control winding 21 of the magnetic amplifier 22 will unsaturate the self-saturating magnetic amplifier to increase its impedance and thereby to reduce the rectified alternating current in the line 23 which is rectified in the full wave bridge rectifier shown as the rectifiers 26A, 26B, 26C, and 26D and 31 and 32. The output of this bridge rectifier supplies excitation to the separately excited field winding 4 of the generator.

As the current between the generator 1 and the load line 6 increases, the current through the current control winding 10 increases. This increasing current in the control winding 10 saturates the reactor 12 reducing its impedance. The impedance reduction allows the current produced by the alternating voltage supply from the secondary winding 18 to increase. This current will be proportional to the current in the control winding 10 times the turns ratio as previously described for the voltage control. At no current in the control winding 10 the current flow in the reactor 12, the transformer winding 18 and bridge rectifier 20 is negligible. The voltage drop across the reactor 12 remains at a value substantially equal to that across the winding 18. During one-half cycle, the current flow is through the current control reactor 12, through rectifier A of the bridge rectifier 20, through the control coil 21, through the bridge rectifier 19, and through the rectifier B of the bridge rectifier 20. During the other half-cycles, the current flow is through leg C of the bridge rectifier 20, through the control coil 21, through the bridge rectifier 19, and back through the rectifier D of the bridge rectifier 20, through the reactor 12 to the secondary winding 18. Thus, the bridge rectifiers 19 and 20 are connected to form a unidirectional loop, with the control winding 21 serially connected in one portion or leg thereof.

In the operation of this system, the voltage output of the windings 17 and 18 is relatively constant and the drop across the control reactors 11 and 12 is substantially equal to this voltage. The windings 17 and 18 are so connected to the alternating current power supply terminal 14 that legs A of the bridge rectifiers 19 and 20 are conducting at the same time. With the current from the winding 17 at a maximum and an appreciable current from winding 18, a portion of the current from the winding 17 equal to the current required to satisfy the control winding 10 times the turns ratio relationship will maintain the reactor 12 voltage equal to the voltage produced by winding 18. This current will flow through the rectifier B of the bridge rectifier 20, through the winding 18 and the reactor 12, and through the rectifier A of the bridge rectifier 20. At this time the rectifiers C and D of the bridge rectifier 20 are connected to shunt any excess current of the loop circuit and block any current tending to flow in the wrong direction in the loop circuit. Thus, the fact that current is flowing through the winding 18 at the same time the winding 17 is a maximum will not of itself cause an appreciable change in the current through the control winding 21.

If the current through the load is at a maximum, the impedance of the reactor 12 is at a minimum to allow the current from the secondary winding 18 to be sufficient to control the control winding 21 to unsaturate the magnetic amplifier 22 and reduce the field produced by the separately exciting winding 4 of the generator 1.

Assuming that the currents from both windings 17 and 18 are at a maximum and equal, the current in each loop circuit will be at a maximum and the voltage drop across the reactors will still be approximately equal to the voltage produced by the transformer windings 17 and 18. Under these conditions, all of the current, equal to either signal alone, will flow through both of the secondary windings 17 and 18, through the voltage dropping reactors 11 and 12, and also through the control winding 21 to unsaturate the magnetic amplifier 22.

Figure 3:
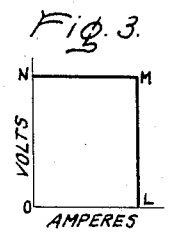
Fig. 3 shows the volt ampere limit characteristic of the generator being controlled by the circuit of Fig. 1.

Referring to Fig. 3 I have shown a curve of the operation of the generator 1 where the abscissa scale is amperes and the ordinate scale is volts. The generator may be operated with the control system shown in Fig. 1 any place within the box bounded by the curve LMNO. Along the maximum volt scale, line NM, the current from the secondary winding 17 controls the excitation produced by the winding 4 of the generator. Along the maximum ampere scale, line ML, the current from the secondary winding 18 controls the maximum excitation of the generator 1.

However, in a diesel electric generator power system, the diesel engine has a limited power rating which is generally less than the maximum rating of the voltage times the maximum rating of the amperage. Thus, continued operation at point M is impossible without stalling the diesel prime mover. Therefore, it is essential to have the generator output limited to remove this corner of the operating volt ampere characteristic of the generator.

Figure 2:
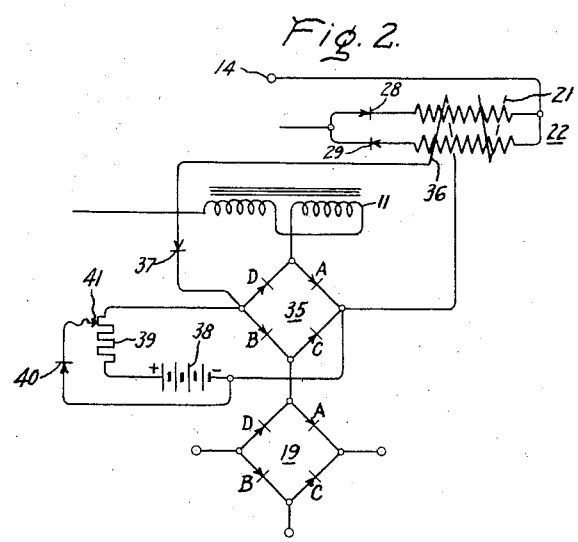
Fig. 2 shows a modification of a control circuit of Fig. 1.
Figure 4:
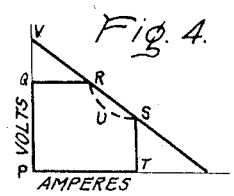
Fig. 4 shows the volt ampere limit characteristic of the generator using the modification shown in Fig. 2.

Such an operating characteristic is shown in Fig. 4 where the ordinate scale is volts and the abscissa scale is amperes. In Fig. 4, the generator may be operated any place within the curve PQRST. To obtain such operation, I have modified the control circuit of Fig. 1, as shown in Fig. 2, by adding the bridge rectifier 35 between the voltage control reactor 11 and the bridge rectifier 19. With generator 1 operating at the maximum voltage (line QR of Fig. 4) the current flow during one-half cycle appears to be through the reactor 11, the bridge rectifier 35, the bridge rectifier 19, to follow the same current path as discussed with regard to Fig. 1. The control winding 36 is connected across the bridge rectifier 35 to aid the control winding 21 in unsaturating the magnetic amplifier 22. However, the battery 38 is connected in series with a resistor 39 across the control winding 36 so that current from the battery flows through the bridge rectifier 35 in sufficient magnitude to prevent aiding current flow in the control winding 36 until the volt-amp relation (Fig 4) is between the points R and S. In order to prevent current from the battery passing through the control winding 36 in such a direction as to counteract the effect of the control winding 21 so that the maximum voltage would be increased (line RV of Fig. 4), the blocking rectifier 37 is connected in series with the control winding 36. Current will flow in 36 when the reactor 11 output exceeds the battery bias determined by resistor 39.

When the current through the bridge rectifier 35 is sufficient to overcome the battery bias across the rectifier 37, current will flow through both the battery circuit and the control winding 36 to aid the control winding 21 and produce a sloping line RS in the generator operating limits.

Often it is desired to have a true horsepower characteristic which is not the straight line RS but the curve RUS. This may be accomplished by the addition of the rectifier 40 connected between the voltage tap 41 on the resistor 39 and the rectifiers A and C of the bridge rectifier 35. The curvature of the line RUS may be controlled by the positioning of the voltage tap 41 on the voltage divider resistor 39.

Of course, a similar result could be obtained by inserting the bridge rectifier 35 and its associated circuitry in circuit with the current control reactor 12 and the winding 18. If it were desired to provide control by more than two direct current signals more bridge rectifiers with similar circuits to those shown with the bridge rectifiers 19 and 20 could be inserted between the bridge rectifiers 19 and 20 with the same theory applying as discussed above.

While I have shown and described a particular embodiment of this invention, further modifications and improvements will occur to those skilled in the art. I desire it to be understood, therefore, that this invention is not limited to the form shown, and I intend by the appended claims to cover all modifications which do not depart from the spirit and scope of this invention.

What I claim as new and desire to secure by Letters Patent of the United States is:

1. A circuit for deriving a control signal proportional to the largest of a plurality of control signals, comprising means for producing a plurality of signals proportional to characteristics of an electric apparatus, a unidirectional loop circuit, means for connecting said signals to said unidirectional loop circuit so that a portion of the loop circuit carries only a current equal to the largest of the signals, a sensing means serially connected in said portion of said loop circuit, said sensing means having an impedance less than the impedance of said signal producing means.

2. In a circuit for comparing a plurality of direct current signals and deriving a direct current signal proportional to the largest direct current signal of the plurality of direct current signals compared, a plurality of signal producing means respectively connected to said direct current signals for deriving a plurality of alternating current signals proportional to said direct current signals, a plurality of bridge rectifier means connected to allow current flow in one direction in a loop circuit for receiving, rectifying and causing current flow from said alternating current signals in said loop circuit to provide a current proportional to the largest alternating current signal through said loop circuit, and control means serially connected in said loop circuit to be energized by said current, said control means having an impedance less than the impedance of said signal producing means.

3. In a circuit for comparing a plurality of direct current signals and deriving a direct current signal proportional to the largest direct current signal of the plurality of direct current signals, a plurality of transformers connected to have their primaries energized by a constant voltage source so that their secondary windings have a substantially constant voltage for the currents contemplated, a plurality of saturable reactors one each connected in circuit with secondaries of said transformers respectively and each having a saturating control winding connected to be energized by said direct current signals for deriving in conjunction with said transformer secondaries a plurality of alternating current signals proportional to said direct current signals, a plurality of bridge rectifier means connected to allow current flow in one direction in a closed loop circuit connected respectively in circuit with said secondary windings and said reactors for receiving, rectifying and causing current flow from said alternating current signals in said loop to provide a current in said loop proportional to the largest of said alternating current signals, and control means serially connected in said loop to be energized by said current, said control means having an impedance less than the impedance of said saturable reactors.

4. A static excitation power system comprising a generator adapted to be electrically connected to a load and having a separately excited field winding, a thermal prime mover mechanically connected to drive said generator, a source of voltage connected to energize said field winding, a self-saturating magnetic amplifier serially connected between said source and said field winding for reducing the current in said field winding when said magnetic amplifier is unsaturated, a control winding magnetically connected to unsaturate said magnetic amplifier, means for deriving an alternating current proportional to the current in said generator, and bridge rectifiers connected to each other in a unidirectional loop circuit for providing a unidirectional current to energize said control winding in proportion to the larger of said alternating currents derived whereby the output of said generator will be limited by the reduction of the excitation from said field winding.

5. A static excitation power system comprising a generator adapted to be electrically connected to a load and having a separately excited field winding, a source of voltage connected to energize said field winding, a self-saturating magnetic amplifier serially connected between said source and said field winding for reducing the current in said field winding when said magnetic amplifier is unsaturated, a magnetic amplifier control winding magnetically connected to unsaturate said magnetic amplifier, a transformer having a primary winding connected across a constant voltage alternating current source and a secondary winding, a control reactor having its saturating control winding connected to sense the voltage of said generator, said secondary winding and said voltage control reactor being serially connected for deriving an alternating current proportional to the voltage of said generator, another transformer having a primary winding connected across a constant voltage alternating current source and a secondary winding, a current control reactor having a control winding connected to sense the current in said generator, said secondary winding of said other transformer and said current control reactor serially connected for deriving an alternating current proportional to the current in said generator, and a pair of bridge rectifiers connected in a unidirectional loop circuit with each other and each connected respectively in circuit with one of said transformer secondary windings and said reactors, said magnetic amplifier control winding connected in one leg of said loop to receive a direct current in proportion to the larger of said alternating currents whereby the output of said generator will be limited by the reduction of the excitation from said field winding, said magnetic amplifier control winding having an impedance less than the impedance of said control reactors.

6. A static excitation power system comprising a generator adapted to be electrically connected to a load and having a separately excited field winding, a source of voltage connected to energize said field winding, a self-saturating magnetic amplifier serially connected between said source and said field winding for reducing the current in said field winding when said magnetic amplifier is unsaturated, a first control winding magnetically connected to unsaturate said magnetic amplifier, a second control winding magnetically connected to unsaturate said magnetic amplifier, means for deriving an alternating current proportional to the voltage of said generator, means for deriving an A.-C. current proportional to the current of said generator, a pair of bridge rectifiers connected to each other to form a unidirectional loop circuit with said first control winding being serially connected in one leg thereof, each of said bridge rectifiers being connected respectively in circuit with each of said means for providing a unidirectional current to energize said first control winding in proportion to the larger of said alternating currents, and a third bridge rectifier connected between one of said pair of bridge rectifiers and its associated means for providing unidirectional current to energize said second control winding, whereby the output of said generator will be limited by the reduction of the excitation from said field winding.

7. A static excitation power system comprising a generator adapted to be electrically connected to a load and having a separately excited field winding, a thermal prime mover mechanically connected to drive said generator, a source of voltage connected to energize said field winding, a self-saturating magnetic amplifier serially connected between said source and said field winding for reducing the current in said field winding when said magnetic amplifier is unsaturated, a magnetic amplifier control winding magnetically connected to unsaturate said magnetic amplifier, a transformer having a primary winding connected across a constant voltage alternating current source and a secondary winding, a control reactor having its saturating control winding connected to sense the voltage of said generator, said secondary winding and said voltage control reactor being serially connected for deriving an alternating current proportional to the voltage of said generator, another transformer having a primary winding connected across a constant voltage alternating current source and a secondary winding, a current control reactor having a control winding connected to sense the current in said generator, said secondary winding of said other transformer and said current control reactor serially connected for deriving an alternating current proportional to the current in said generator, and a pair of bridge rectifiers connected in a unidirectional loop circuit with each other, said magnetic amplifier control winding being serially connected between said bridges in one side of said loop, each of said bridge rectifiers being connected in circuit with one of said transformer secondary windings and said reactors respectively for providing a direct current to energize said control winding in proportion to the larger of said alternating currents whereby the output of said generator will be limited by the reduction of the excitation from said field winding, said magnetic amplifier control winding having an impedance less than the impedance of said control reactors.

8. A static excitation power system comprising a generator adapted to be electrically connected to a load and having a separately excited field winding, a thermal prime mover mechanically connected to drive said generator, a source of voltage connected to energize said field winding, a self-saturating magnetic amplifier serially connected between said source and said field winding for reducing the current in said field winding when said magnetic amplifier is unsaturated, a first control winding magnetically connected to unsaturate said magnetic amplifier, a second control winding magnetically connected to unsaturate said magnetic amplifier, means for deriving an alternating current proportional to the voltage across said generator, means for deriving an alternating current proportional to the current in said generator, a pair of bridge rectifiers connected to each other to form a unidirectional loop with said first control winding serially connected in one leg thereof, each of said bridge rectifiers being connected respectively in circuit with each of said means for providing a direct current to energize said first control winding in proportion to the larger of said alternating currents, a third bridge rectifier connected between one of said bridge rectifiers and its associated means for providing direct current to energize said second control winding, and means for biasing said second control winding to prevent current flow therethrough until a predetermined horsepower is developed by said generator, whereby the output of said generator will be limited by the reduction of the excitation from said field winding in proportion to the current flow in said first control winding when the horsepower of the system is less than said predetermined value and by the current flow said first and said second control windings when said horsepower is greater than said value.

9. A static excitation power system comprising a direct current generator adapted to be electrically connected to a load and having a separately excited field winding, a thermal prime mover mechanically connected to drive said generator, a source of constant alternating voltage connected to energize said field winding, rectifiers connected in circuit with said source and said winding to provide direct current to said winding, a self-saturating magnetic amplifier serially connected between said source and said field winding for reducing the current in said field winding when said magnetic amplifier is unsaturated, a first control winding magnetically connected to unsaturate said magnetic amplifier, a second control winding magnetically connected to unsaturate said magnetic amplifier, means for deriving an alternating current proportional to the voltage across said generator, means for deriving an alternating current proportional to the current in said generator, a pair of bridge rectifiers connected to each other to form a unidirectional loop with said first control winding serially connected in one leg of said loop thereof, each of said bridge rectifiers being connected respectively in circuit with each of said means for providing a direct current to energize said first control winding in proportion to the larger of said alternating currents, a third bridge rectifier connected between one of said bridge rectifiers and its associated means for providing direct current to energize said second control winding, a battery connected across said second control winding for biasing said second control winding to prevent current flow therethrough in one direction until a predetermined horsepower is developed by said generator, and a rectifier connected in series with said second control winding to prevent current flow therethrough in the other direction, whereby the output of said generator will be limited by the reduction of the excitation from said field winding in proportion to the current flow in said first control winding when the horsepower of the system is less than said predetermined value and of the current flow in said first and said second control windings when said horsepower is greater than said value.

10. In an electric circuit for comparing a plurality of current signals, a plurality of signal means each for producing a separate electric current signal, a loop circuit, a plurality of bridge rectifiers connected serially in said loop circuit to allow unidirectional current flow therein, electric circuit means for connecting each of said signal means to said one of said bridge rectifiers respectively to provide a direct current in said bridge rectifiers and thereby to provide a direct current in said loop circuit proportional to the largest of said signals, and sensing means connected to said loop circuit for sensing the current therein, said sensing means having an impedance less than the impedance of said signal means.

11. In an electric circuit for comparing a plurality of current signals, a plurality of signal means each connected in circuit with an apparatus to be controlled and each adapted to produce a separate electric signal, a loop circuit, a plurality of bridge rectifiers each connected in said loop circuit to allow unidirectional current flow in said loop circuit, electric circuit means connected to said signal means for connecting each of said signal means to one of said bridge rectifiers to provide a direct current in said bridge rectifiers and thereby provide a direct current in said loop circuit, and sensing means connected to said loop circuit for sensing the current therein, said signal means being connected across diagonals of said bridge rectifiers so that the signal in said loop circuit flows in each one of said signal means to the extent that the signal is produced in one of said signal means whereby the largest of said signals affects said sensing means.

12. In a circuit for comparing a plurality of current signals, a plurality of unidirectional signal producing means each connected in circuit with an apparatus and adapted to produce a separate electric signal in response to some function thereof, a loop circuit, electric circuit means connected to said signal means for connecting each of said signal means to said loop circuit to provide a unidirectional current therein in response to certain functions of said apparatus, said signal means being connected to said loop circuit so that the signal in said loop circuit flows in each one of said signal means to the extent that the signal is produced in one of said signal means, a shunt connection around each connection of each signal to allow any excess current in said loop circuit to bypass any of said signal means producing less current than some other of said signal means whereby the largest of said signals affects the maximum current flow in said loop circuit, a blocking rectifier in said shunt connection and sensing means connected to said loop circuit for sensing the current therein.

13. An electric circuit for utilizing the largest of a plurality of variable electric signals comprising a loop circuit, detecting means connected in said loop circuit for detecting current flow therein, a plurality of rectifying devices each connected serially to allow only unidirectional current flow in said loop circuit, and a plurality of signal producing means each connected in parallel with one of said rectifier devices to shunt current therearound in proportion to the current flow within said signal producing means, whereby the maximum current flow in said loop circuit will be equal to the largest signal produced by said signal producing means, said detecting means having an impedance less than the impedance of said signal producing means.

References Cited in the file of this patent

UNITED STATES PATENTS

| | | |
|---|---|---|
| 1,855,639 | Lee | Apr. 26, 1932 |
| 2,695,953 | Seabury | Nov. 30, 1954 |
| 2,719,259 | Miner | Sept. 27, 1955 |